US008259670B2

(12) United States Patent  (10) Patent No.: US 8,259,670 B2
Park et al.  (45) Date of Patent: Sep. 4, 2012

(54) HANDOVER METHOD AND HANDOVER APPARATUS

(75) Inventors: Soo-hong Park, Yongin-si (KR); Pyung-soo Kim, Seoul (KR); Young-keun Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 327 days.

(21) Appl. No.: 11/143,577

(22) Filed: Jun. 3, 2005

(65) Prior Publication Data

US 2005/0288019 A1    Dec. 29, 2005

(30) Foreign Application Priority Data

Jun. 28, 2004  (KR) .................. 10-2004-0048936

(51) Int. Cl.
 *H04W 4/00* (2009.01)
 *H04W 36/00* (2009.01)
(52) U.S. Cl. ............... 370/331; 455/438; 455/552.1
(58) Field of Classification Search .............. 455/422.1, 455/436, 442, 438, 437, 552.1, 553.1; 370/310, 370/328, 329, 331, 332
 See application file for complete search history.

(56) References Cited

U.S. PATENT DOCUMENTS

| 5,907,542 | A | * | 5/1999 | Kuehnel et al. | 455/437 |
| 6,115,608 | A | * | 9/2000 | Duran et al. | 455/436 |
| 6,321,090 | B1 | * | 11/2001 | Soliman | 455/440 |
| 6,415,149 | B1 | * | 7/2002 | Bevan et al. | 455/442 |
| 6,577,868 | B1 | * | 6/2003 | Vialen et al. | 455/442 |
| 7,236,475 | B2 | * | 6/2007 | Watanabe et al. | 370/331 |
| 7,260,399 | B1 | * | 8/2007 | Oh et al. | 455/436 |
| 7,403,506 | B2 | * | 7/2008 | Lee et al. | 370/331 |
| 2002/0160785 | A1 | | 10/2002 | Ovesjo et al. | |
| 2004/0230581 | A1 | * | 11/2004 | Lee | 707/10 |
| 2004/0240411 | A1 | | 12/2004 | Suzuki | |
| 2004/0267931 | A1 | * | 12/2004 | Mullany et al. | 709/226 |
| 2005/0141456 | A1 | * | 6/2005 | Shaheen | 370/331 |
| 2005/0227691 | A1 | * | 10/2005 | Pecen et al. | 455/435.2 |
| 2005/0265284 | A1 | * | 12/2005 | Hsu et al. | 370/331 |
| 2006/0128372 | A1 | * | 6/2006 | Gazzola | 455/424 |
| 2008/0048673 | A1 | | 2/2008 | Park et al. | |

FOREIGN PATENT DOCUMENTS

| KR | 10-2004-0049124 | 6/2004 |
| KR | 2004-49125 | 6/2004 |
| KR | 10-2005-0077122 | 8/2005 |

OTHER PUBLICATIONS

Korean Notice of Allowance dated Feb. 6, 2009 in corresponding U.S. Appl. No. 10-2004-0048936.

* cited by examiner

*Primary Examiner* — Quochien B Vuong
(74) *Attorney, Agent, or Firm* — Staas & Halsey LLP

(57) ABSTRACT

A handover apparatus and a handover method performing a fast handover in an environment of various communication networks having different communication standards, the handover method, which is performed in a mobile node (MN) that moves between different types of networks, including determining whether a signal received from a node that connects the MN to a first type network contains network information indicating that the MN moves from the first type network to a second type network; and selectively performing a handover between the first and second type networks based on the determination results. Therefore, the MN can predict whether it moves to a new network, thereby performing a fast handover.

42 Claims, 10 Drawing Sheets

HANDOVER METHOD AND HANDOVER APPARATUS

CROSS-REFERENCE TO RELATED APPLICATION

This application claims the benefit of Korean Patent Application No. 2004-48936, filed on Jun. 28, 2004 in the Korean Intellectual Property Office, the disclosure of which is incorporated herein by reference.

BACKGROUND OF THE INVENTION

1. Field of the Invention

The present invention relates to a handover apparatus and a handover method in a wireless communication environment, and more particularly, to a handover apparatus and a handover method for performing a fast handover in an environment of various communication networks having a different communication standard.

2. Description of the Related Art

A 3 Generation Partnership Project (3GPP), an Institute of Electrical and Electronics Engineers (IEEE) 802.16, IEEE 802.11, and Bluetooth are wireless communication standards. A mobile node (MN) that uses various communication networks in an environment of various communication networks having a different communication standard is released. The MN includes a plurality of interfaces that support the various communication networks. When the MN moves from one network to another network, the MN selects an interface that supports a communication network at which the MN is now located.

When the MN changes an interface, the MN must perform a handover according to a change in the interface. However, as the number of subscribers to mobile communication services rapidly increases, and the mobile communication services become more diversified so that they can provide multimedia communications, the demand for seamless communications becomes stronger. Accordingly, the importance of a fast handover also becomes essential. Conventionally, the MN performs the handover in a state where the plurality of interfaces are enabled. Therefore, every interface should always be enabled in order to perform the handover.

SUMMARY OF THE INVENTION

According to an aspect of the present invention, there is provided a handover apparatus and handover method in which an MN can predict its movement to a new network in order to perform a fast handover.

According to another aspect of the present invention, there is provided a computer-readable recording medium, on which a program for executing the method is recorded.

According to an aspect of the present invention, there is provided a handover method, which is performed in a mobile node (MN) that moves between different types of networks, the handover method including determining whether a signal received from a node that connects the MN to a first type network contains network information indicating that the MN moves from the first type network to a second type network; and selectively performing a handover between the first and second type networks based on the determination result.

According to another aspect of the present invention, there is provided a handover apparatus, which is installed in an MN that moves between different types of networks, the handover apparatus including a network information determination unit determining whether a signal received from a node that connects the MN to a first type network contains network information indicating that the MN moves from the first type network to a second type network; and a handover unit selectively performing a handover between the first and second type networks based on the determination results obtained by the network information determination unit.

According to another aspect of the present invention, there is provided a handover method, which is performed in an MN that moves between different types of networks, the handover method including determining whether a signal received from a node that connects the MN to a first type network is a network signal indicating that the MN moves from the first type network to a second type network; and selectively performing a handover between the first and second type networks based on the determination result.

According to still another aspect of the present invention, there is provided a handover apparatus, which is installed in an MN that moves between different types of networks, the handover apparatus including a network signal determination unit determining whether a signal received from a node that connects the MN to a first type network is a network signal indicating that the MN moves from the first type network to a second type network; and a handover unit selectively performing a handover between the first and second type networks based on the determination results obtained by the network signal determination unit.

According to yet another aspect of the present invention, there is provided a computer-readable recording medium, on which a program for executing the first handover method is recorded.

According to further aspect of the present invention, there is provided a computer-readable recording medium, on which a program for executing the second handover method is recorded.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
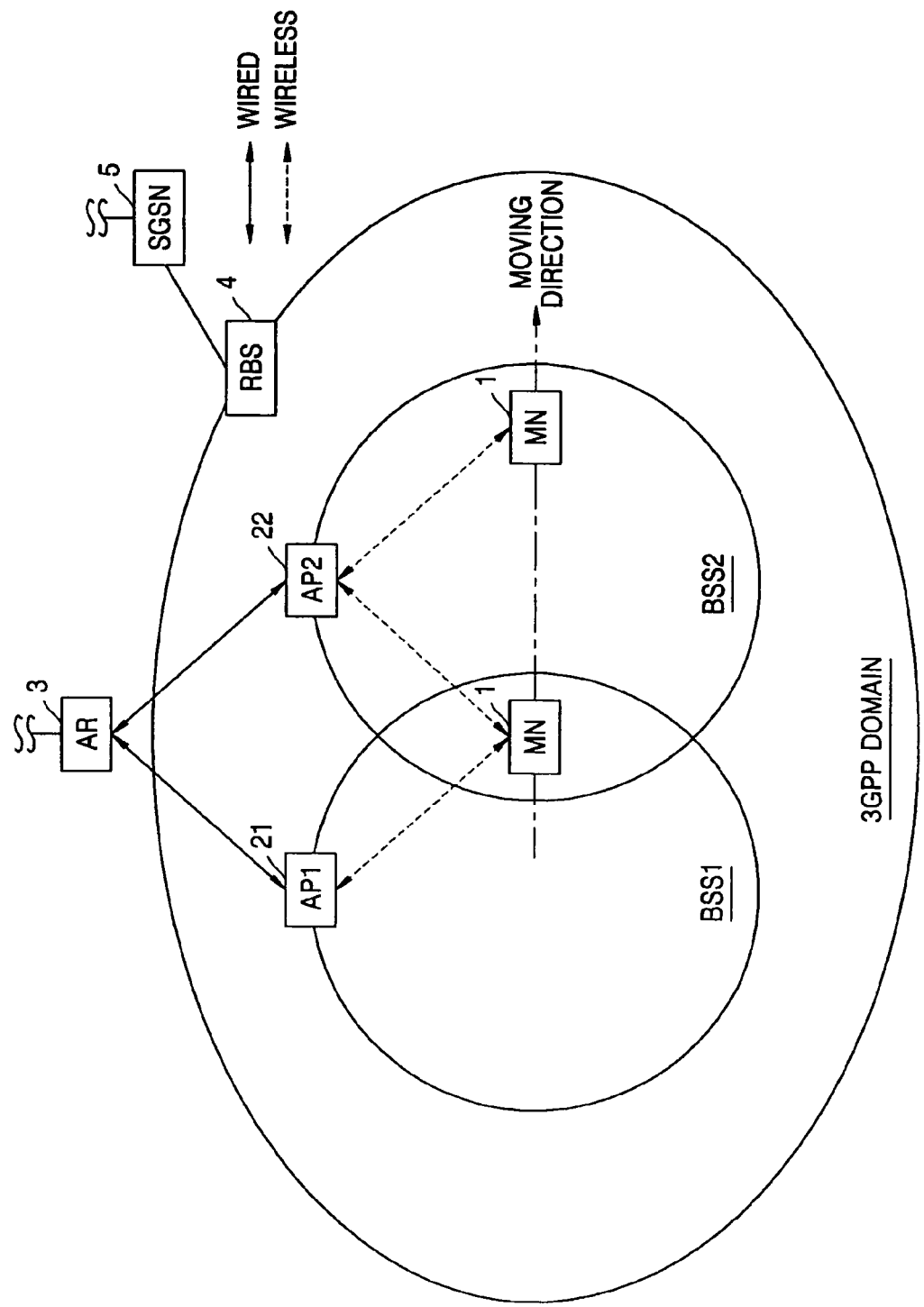
FIG. 1 is a diagram illustrating a first communication environment to which embodiments of the present invention are applied.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a first communication environment to which embodiments of the present invention are applied. Referring to FIG. 1, the first communication environment to which embodiments of the present invention are applied is an environment of various communication networks having a different communication standard in which an IEEE 802.11 standard-based wireless LAN is included in a 3GPP standard-based cellular network. The first communication environment is very briefly illustrated for understanding and an actual communication environment is not limited to nodes therein.

The IEEE 802.11 standard-based wireless LAN includes a mobile node (MN) 1, a first access point (AP) 21, a second AP 22, and an access router (AR) 3.

The MN 1 which is a user mobile communication terminal moves as a user moves as shown in FIG. 1.

The first AP 21 and the second AP 22 are nodes that communicate wirelessly with the MN 1. According to the IEEE 802.11 standard, a valid travel distance of a radiowave emitted from an AP, i.e., a cell managed by an AP, is referred to as a basic service set (BSS). Cells managed by the first AP 21 and the second AP 22 are referred to as a first BSS and a second BSS, respectively.

The AR 3 transmits a signal received from the MN 1 through the first AP 21 or the second AP 22 to a subnet in which the AR 3 is located.

The 3GPP standard-based cellular network includes the MN 1, a radio base station (RBS) 4, and a serving GPRS (general packet radio service) support node (SGSN) 5.

The RBS 4 is a node that communicates wirelessly with the MN 1. A valid travel distance of a radiowave emitted from the RBS 4, i.e., a cell managed by the RBS 4, is referred to as a 3GPP domain.

The SGSN 5 is a node that connects the RBS 4 and a gateway GPRS support node (GGSN) (not shown) through a 3GPP backbone (not shown) in a middle point of the RBS 4 and the GGSN.

The MN 1 of the first communication environment includes a plurality of interfaces that support the IEEE 802.11 standard-based wireless LAN and the 3GPP standard-based cellular network and moves to the 3GPP domain though the first BBS and the second BBS.

Figure 2:
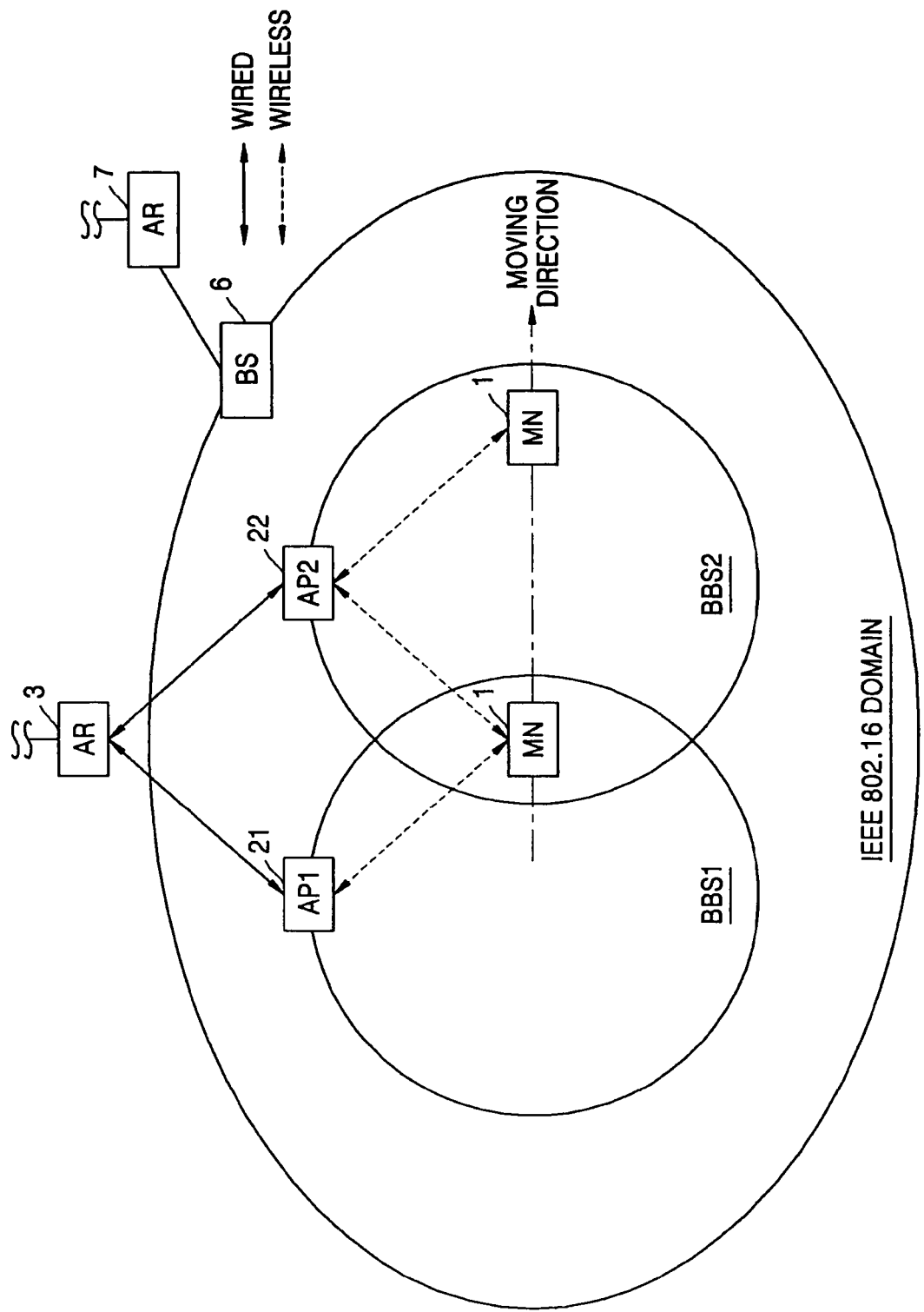
FIG. 2 is a diagram illustrating a second communication environment to which embodiments of the present invention are applied.

FIG. 2 is a diagram illustrating a second communication environment to which embodiments of the present invention are applied. Referring to FIG. 2, the second communication environment to which embodiments of the present invention are applied is an environment of various communication networks having different communication standards in which an IEEE 802.11 standard-based wireless LAN is included in an IEEE 802.16 standard-based wireless metropolitan area network (MAN). The second communication environment is briefly illustrated for understanding and an actual communication environment is not limited to nodes therein.

The IEEE 802.11 standard-based wireless LAN is the same as described with reference to FIG. 1 and is left out.

The IEEE 802.16 standard-based wireless MAN includes the MN 1, a base station (BS) 6, and an AR 7.

The BS 6 is a node that communicates wirelessly with the MN 1. A valid travel distance of a radiowave emitted from the BS 6, i.e., a cell managed by the BS 6, is referred to as an IEEE 802.16 domain.

The AR 7 transmits a signal received from the MN 1 to a wide area network (WAN) in which the AR 3 is located.

The MN 1 of the second communication environment includes a plurality of interfaces that supports the IEEE 802.11 standard-based wireless LAN and the IEEE 802.16 standard-based wireless MAN and moves to the IEEE 802.16 domain though the first BBS and the second BBS.

Figure 3:
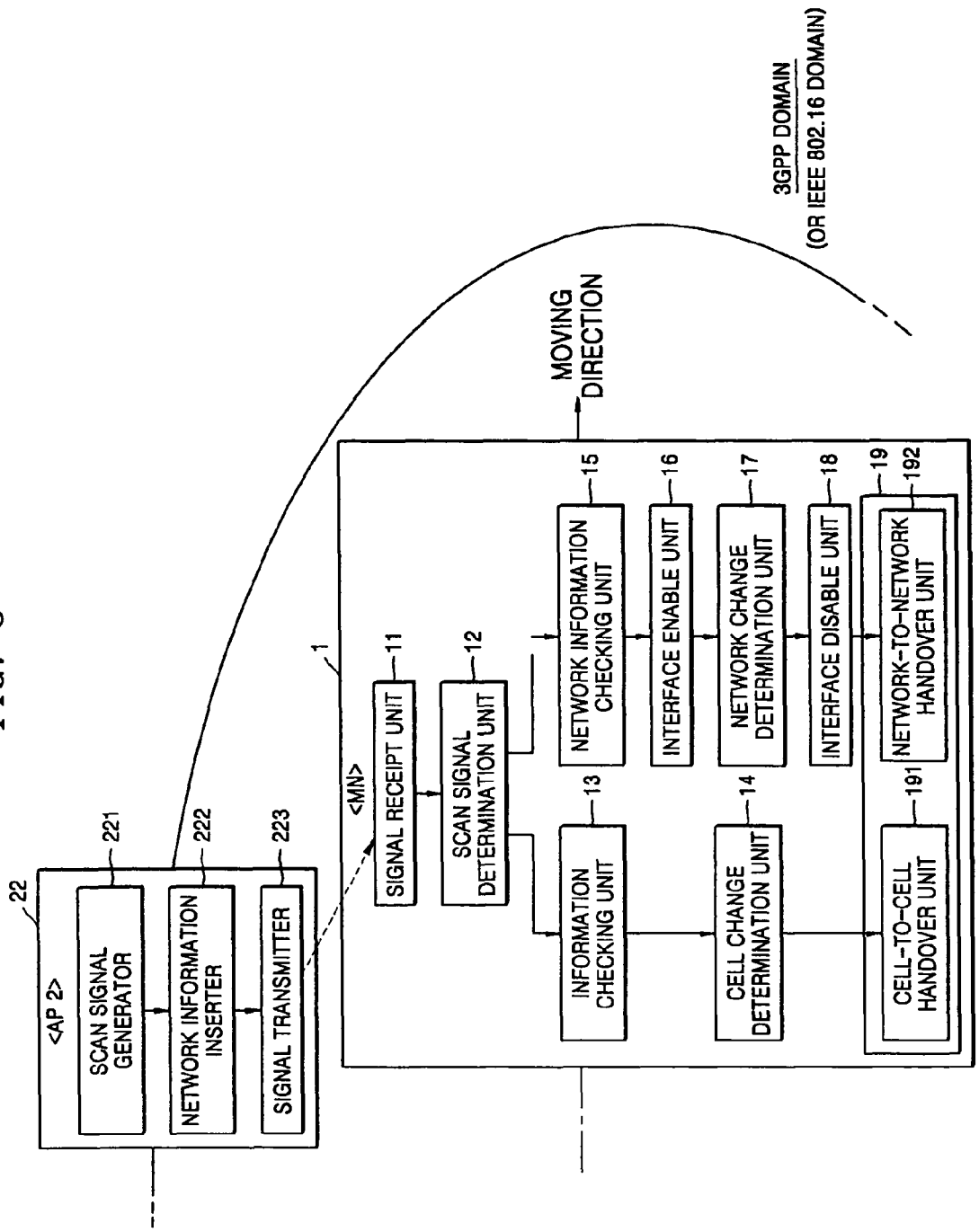
FIG. 3 is a block diagram illustrating a first handover apparatus according to an embodiment of the present invention.

FIG. 3 is a block diagram illustrating a first handover apparatus according to an embodiment of the present invention. Referring to FIG. 3, the first handover apparatus installed in the second AP 22 includes a scan signal generator 221, a network information inserter 222, and a signal transmitter 223. The first handover apparatus installed in the second AP 22 inserts network information indicating that the MN 1 moves from a first type network to a second type network in a scan signal, thereby predicting the movement of the MN 1 to a new network.

The scan signal generator 221 generates a signal requiring the MN 1 to scan the second AP 22, i.e., a scan signal that indicates a cell managed by the second AP 22. According to the IEEE 802.11 standard, the scan signal includes a beacon frame and a probe response frame. The beacon frame is periodically transmitted by the second AP 22, and the probe response frame responds to a probe request frame received from the MN 1. The former is referred to as passive scanning, and the latter is referred to as active scanning.

The network information inserter 222 inserts network information, indicating that the MN 1 moves from the first type network to the second type network, in the scan signal generated by the scan signal generator 221. In the first communication environment shown in FIG. 1, the first type network is the IEEE 802.11 standard-based wireless LAN, and the second type network is the 3GPP standard-based cellular network. In the second communication environment shown in FIG. 2, the first type network is the IEEE 802.11 standard-based wireless LAN, and the second type network is the IEEE 802.16 standard-based wireless MAN.

Figure 4:
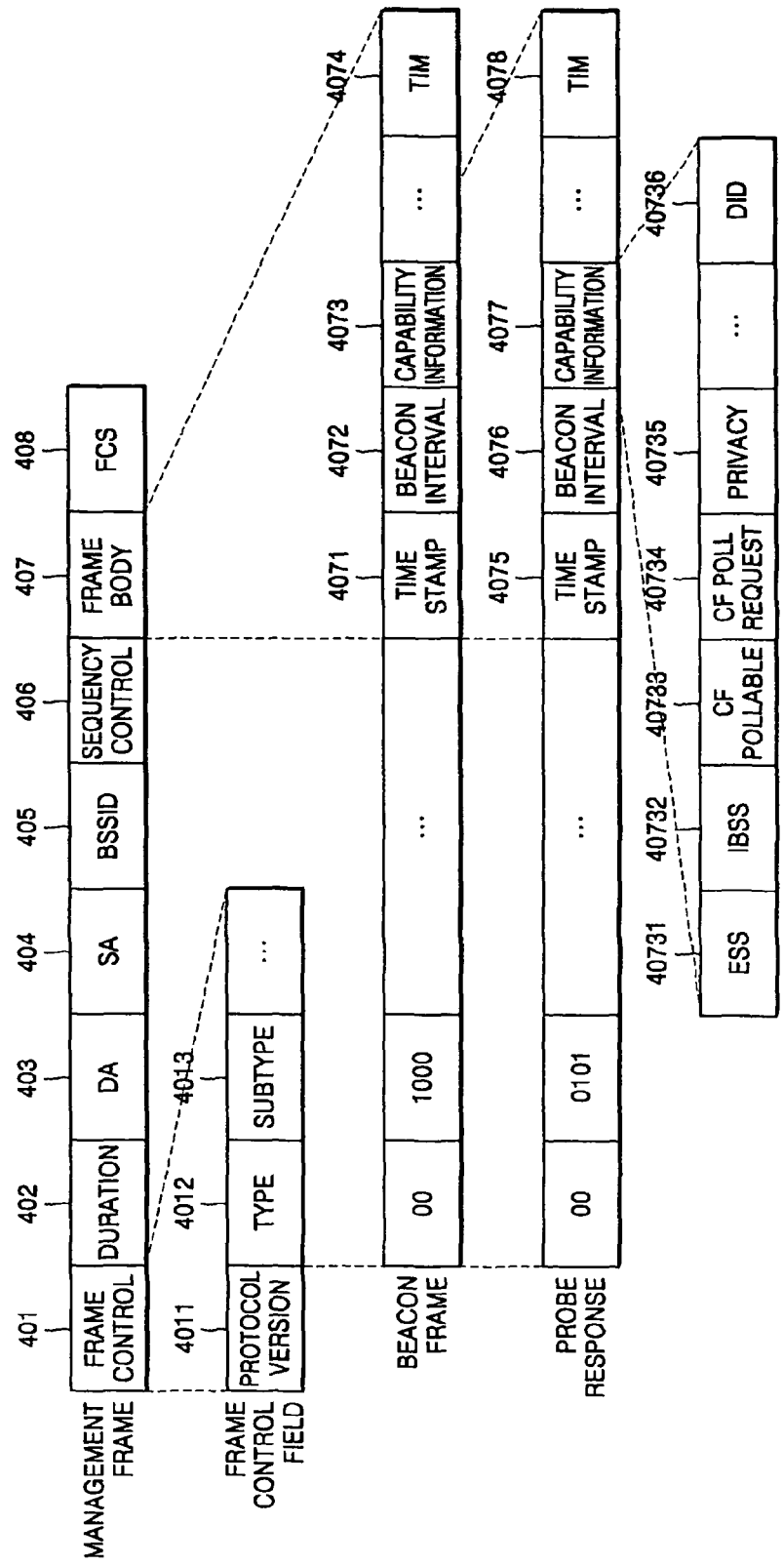
FIG. 4 is a diagram illustrating the format of a beacon frame and a probe response frame according to an embodiment of the present invention.

FIG. 4 is a diagram illustrating the format of a beacon frame and a probe response frame according to an embodiment of the present invention. Referring to FIG. 4, a management frame, which is created based on the IEEE 802.11 standard, includes a frame control field 401, a duration field 402, a destination address field 403, a source address field 404, a basic service set (BSS) identification (ID) field 405, a sequence control field 406, a frame body field 407, and a frame check sequence field 408.

The frame control field 401 includes a protocol version field 4011, a type field 4012, a subtype field 4013, and other fields.

According to the IEEE 802.11 standard, a type field value of the management frame is 0. The beacon frame and the probe response frame which belong to the management frame also have a type field value of 0. A subtype field value of the beacon frame is 1000 and a subtype field value of the probe response frame is 0101.

The frame body field 407 of the beacon frame includes a time stamp field 4071, a beacon interval field 4072, a capability information field 4073, a traffic indication map (TIM) field 4074, and other fields.

Likewise, the frame body field 407 of the probe response frame includes a time stamp field 4075, a beacon interval field 4076, a capability information field 4077, a TIM field 4078, and other fields.

The capability information fields 4073 and 4077 include an extended service set (ESS) field 40731, an independent BSS (IBSS) field 40732, a contention free (CF) pollable field 40733, a CF poll request field 40734, a privacy field 40735, and a domain identifier (DID) field 40736.

Referring to FIG. 4, network information may be contained in the beacon frame or the probe response frame using one portion of a reserved field of the capability information fields 4073 and 4077 of the frame body field 407. The portion is referred to as a DID in FIG. 4. The DID field 40736 stores 00 designating the IEEE 802.11, 01 designating the 3GPP, 10 designating the IEEE 802.16, and the like.

Referring to FIG. 3, the signal transmitter 223 transmits a scan signal in which network information is inserted by the network information inserter 222 to the MN 1. The signal transmitter 223 transmits a beacon frame in which the network information is inserted by the network information inserter 222 to the MN 1 or transmits a probe response frame in which the network information is inserted by the network information inserter 222 to the MN 1 in response to a probe request frame.

The first handover apparatus installed in the MN 1 includes a signal receipt unit 11, a scan signal determination unit 12, a cell information checking unit 13, a cell change determination unit 14, a network information checking unit 15, an interface enable unit 16, a network change determination unit 17, an interface disable unit 18, and a handover unit 19. The handover unit 19 includes a cell-to-cell handover unit 191 and a network-to-network handover unit 192.

The signal receipt unit 11 receives a signal from the second AP 22 that connects the MN 1 to the first type network. The MN 1 must be located in the cell managed by the second AP 22.

The scan signal determination unit 12 determines whether the signal received by the signal receipt unit 11 is a scan signal designating the cell managed by the second AP 22. The scan signal determination unit 12 may determine whether the received signal from the second AP 22 is a beacon signal or a probe response signal designating the second BSS. If the type field of the received signal has a value of 0, and the subtype field of the received signal has a value of 1000, then the scan signal determination unit 12 determines the received signal as the beacon signal. If the type field of the received signal has a value of 0, and the subtype field of the received signal has a value of 0101, then the scan signal determination unit 12 determines the received signal as the probe response signal.

If the scan signal determination unit 12 determines the received signal as the scan signal, the cell information checking unit 13 checks cell information included in the received signal. As described above, the beacon frame and the probe response frame, which are one type of the management frame, include a BSS ID field 405. According to the IEEE 802.11 standard, ID of a BSS corresponding to a cell managed by an AP is contained in the BSS ID field 405. The cell information checking unit 13 checks cell information based on the BSS ID field 405 of the beacon frame or the probe response frame.

The cell change determination unit 14 determines whether the MN 1 has moved from one cell to another cell based on the cell information checked by the cell information checking unit 13. If the ID of the BSS is not identical to a previous ID of the BSS, the cell change determination unit 14 determines that the MN 1 has moved from one cell to another cell.

The cell-to-cell handover unit 191 selectively performs a handover based on the determination results output from the scan signal determination unit 12. To be more specific, if the cell change determination unit 14 determines that the MN 1 has moved from one cell to another cell, the cell-to-cell handover unit 191 performs a handover. If a change in cells corresponds to a change in BSSs, the cell-to-cell handover unit 191 performs a link layer handover. If the change in cells corresponds to a change in subnets, the cell-to-cell handover unit 191 performs a link layer handover and an IP layer handover.

The network information checking unit 15 checks whether the received signal by the signal receipt unit 11 has network information indicating that the MN 1 moves from a first type network to a second type network by referencing the DID field 40736 of the capability information fields 4073 and 4077 of the frame body field 407 of the beacon frame or the probe response frame shown in FIG. 4. As described above, the network information is stored in the DID field 40736 of the capability information fields 4073 and 4077 of the frame body field 407 of the beacon frame or the probe response frame.

If the network information checking unit 15 checks that the received signal by the signal receipt unit 11 has the network information, the interface enable unit 16 enables an interface supporting the second type network. If the network information checking unit 15 checks that the received signal has a 3GPP standard-based cellular network DID, the interface enable unit 16 enables an interface supporting a 3GPP standard-based cellular network. If the network information checking unit 15 checks that the received signal has an IEEE 802.16 standard-based wireless MAN DID, the interface enable unit 16 enables an interface supporting an IEEE 802.16 standard-based wireless MAN.

The network change determination unit 17 determines whether the MN 1 has moved from one network to another network. The network change determination unit 17 determines whether to use the interface enabled by the interface enable unit 16 by analyzing an environment of the interface supporting the first type network. To be more specific, if the signal received using the interface supporting the first type network has a low intensity, the network change determination unit 17 determines not to use the interface supporting the first type network, and determines to use an interface supporting the second type network.

If the network change determination unit 17 determines to use the interface supporting the second type network, the interface disable unit 18 disables the interface supporting the first type network. According to the present embodiment, since the MN 1 can perform a handover in a state where only the interface presently being used is enabled, the conventional problem where every interface needs to be enabled to perform a handover is overcome. As a result, a mobile node reduces power consumption. In particular, since a mobile node uses a portable battery, a reduction in power consumption is essential.

The network-to-network handover unit 192 selectively performs a handover based on the determination results output from the network information checking unit 15. To be more specific, if the network change determination unit 17 determines to use the interface supporting the second type network, the network-to-network handover unit 192 discontinues using the interface disabled by the interface disable unit 18 and starts to use the interface enabled by the interface enable unit 16. If the network change determination unit 17 determines to use an interface supporting the 3GPP standard-based cellular network, the network-to-network handover unit 192 performs a handover that changes from the IEEE 802.11 standard-based wireless LAN to the 3GPP standard-based cellular network. If the network change determination unit 17 determines to use an interface supporting the IEEE 802.16 standard-based wireless MAN, the network-to-network handover unit 192 performs a handover that changes from the IEEE 802.11 standard-based wireless LAN to the IEEE 802.16 standard-based wireless MAN.

Figure 5:
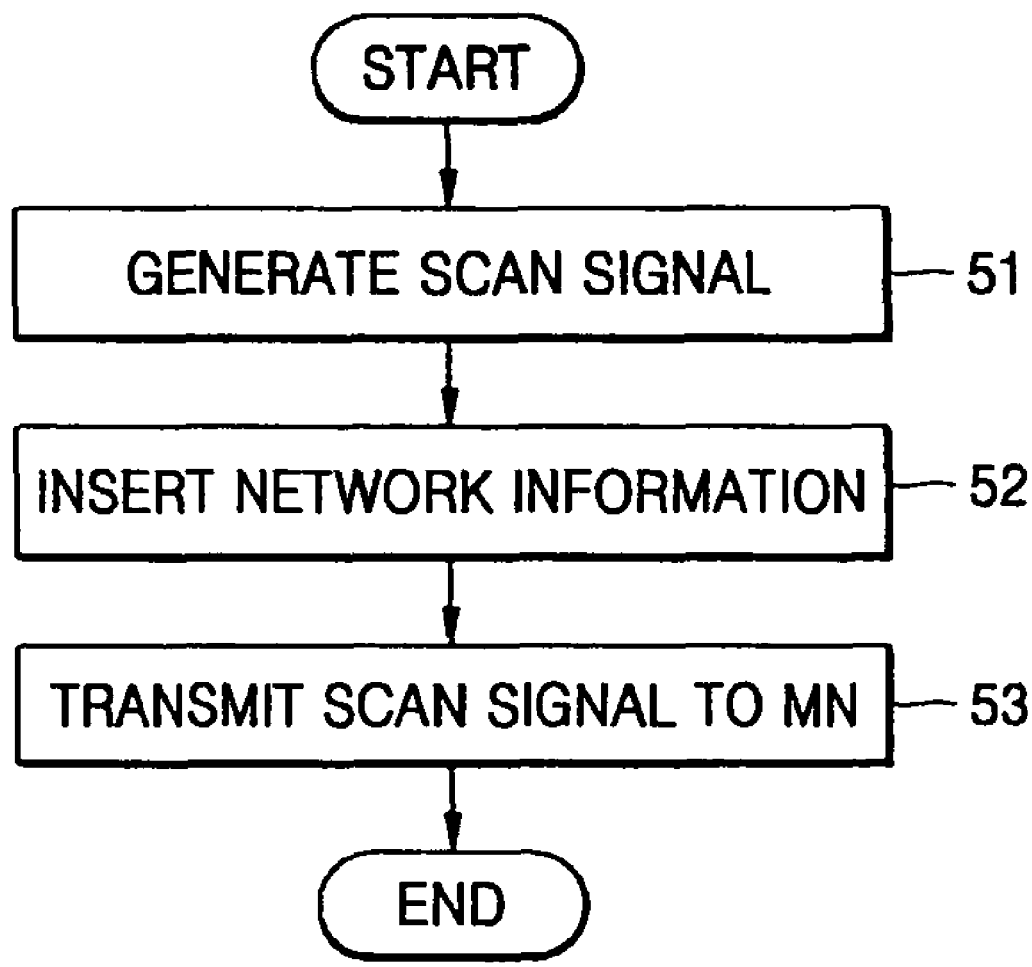
FIG. 5 is a flowchart illustrating a first handover method performed in an AP according to an embodiment of the present invention.

FIG. 5 is a flowchart illustrating a first handover method performed in the second AP 22 according to an embodiment of the present invention. Referring to FIG. 5, the first handover method performed in the second AP 22 is a time series process using the first handover apparatus installed in the second AP 22.

In operation 51, the second AP 22 generates a scan signal designating a cell managed by it.

In operation 52, the second AP 22 inserts network information indicating that the AP moves from a first type network to a second type network in the scan signal generated in operation 501.

In operation 53, the second AP 22 transmits the scan signal in which the network information is inserted to the MN 1.

Figure 6:
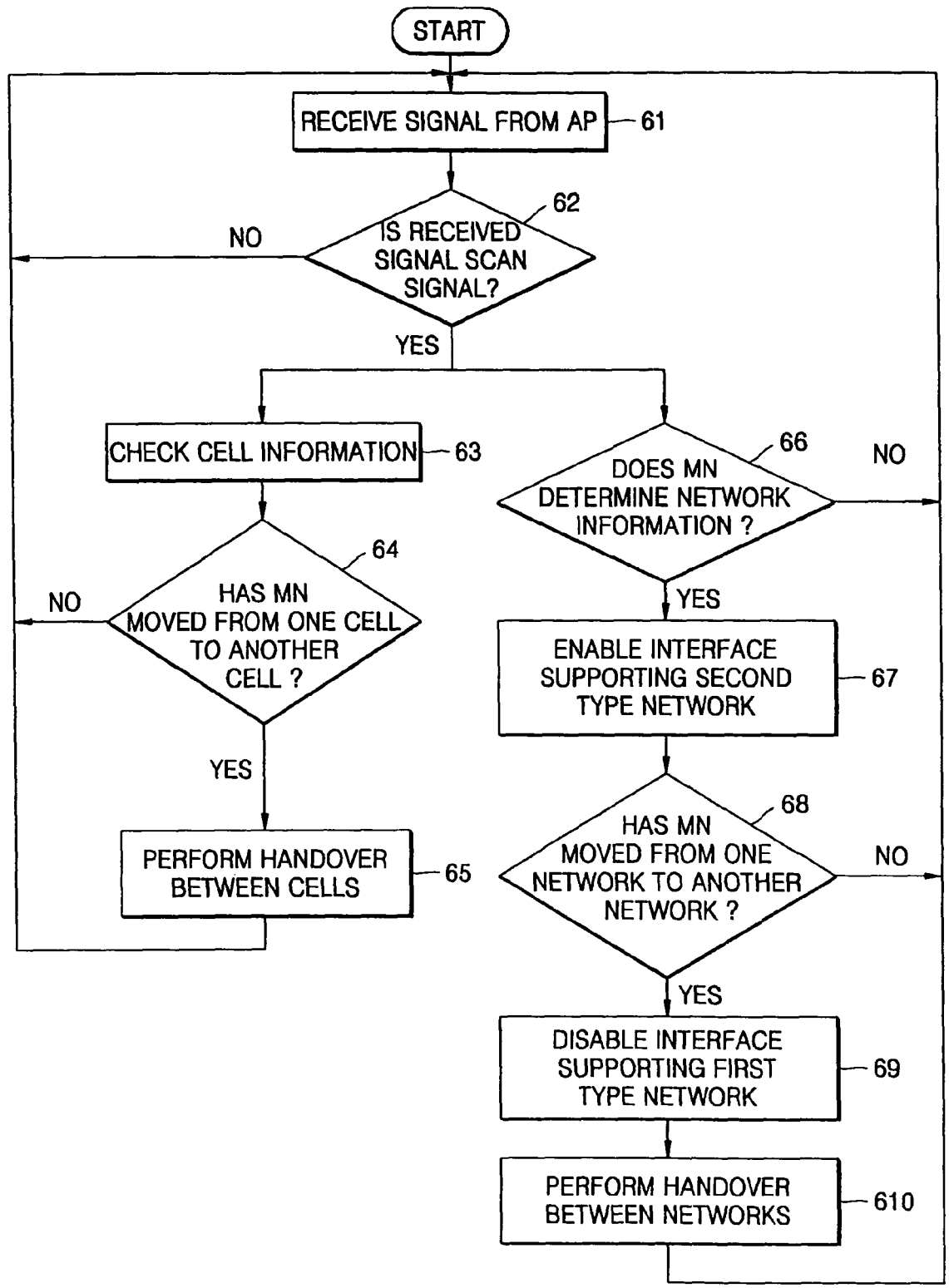
FIG. 6 is a flowchart illustrating a first handover method performed in an MN according to an embodiment of the present invention.

FIG. 6 is a flowchart illustrating a first handover method performed in the MN 1 according to an embodiment of the present invention. Referring to FIG. 6, the first handover method performed in the MN 1 is a time series process using the first handover apparatus installed in the MN 1.

In operation 61, the MN 1 receives a signal from the second AP 22 that connects the MN 1 to the first type network.

In operation 62, the MN 1 determines whether the received signal is a scan signal designating a cell managed by the AP 22. To be more specific, the MN 1 determines whether the received signal is a beacon signal or a probe response signal designating the second BSS.

In operation 63, if the received signal is determined to be the scan signal designating the cell managed by the AP 22, the MN 1 checks cell information included in the received signal.

In operation 64, the MN 1 determines whether the MN 1 has moved from one cell to another cell based on the cell information checked in operation 63.

In operation 65, the MN 1 selectively performs a handover based on the determination results obtained in operation 64. To be more specific, if the MN 1 is determined to have moved from one cell to another cell in operation 64, it performs a cell-to-cell handover.

In operation 66, the MN 1 determines whether the received signal includes the network information indicating that the MN 1 moves from a first type network to a second type network by referencing the DID field 40736 of the capability information fields 4073 and 4077 of the frame body field 407 of the beacon signal or the probe response signal shown in FIG. 4.

In operation 67, the MN 1 enables an interface supporting the second type network if the received signal is determined to include the network information. To be more specific, if the received signal is determined to include 3GPP standard-based cellular network information, the MN 1 enables an interface supporting a 3GPP standard-based cellular network. If the received signal is determined to include IEEE 802.16 standard-based wireless MAN information, the MN 1 enables an interface supporting an IEEE 802.16 standard-based wireless MAN.

In operation 68, the MN 1 determines whether it has moved from one network to another network. To be more specific, the MN 1 determines whether to use the interface enabled by the interface enable unit 16 by analyzing an environment of the interface supporting the first type network. If the signal received using the interface supporting the first type network has a low intensity, the MN 1 determines not to use the interface supporting the first type network, and uses an interface supporting the second type network.

In operation 69, if the MN 1 determines to use the interface supporting the second type network, it disables the interface supporting the first type network.

In operation 610, the MN 1 selectively performs a handover based on the determination results obtained in operation 66. To be more specific, if the MN 1 determines to use the interface supporting the second type network, it discontinues using the interface disabled in operation 68 and starts to use the interface enabled in operation 67. If the MN 1 determines to use an interface supporting the 3GPP standard-based cellular network, the MN 1 performs a handover that changes from the IEEE 802.11 standard-based wireless LAN to the 3GPP standard-based cellular network. If the MN 1 determines to use an interface supporting the IEEE 802.16 standard-based wireless MAN, the MN 1 performs a handover that changes from the IEEE 802.11 standard-based wireless LAN to the IEEE 802.16 standard-based wireless MAN.

Figure 7:
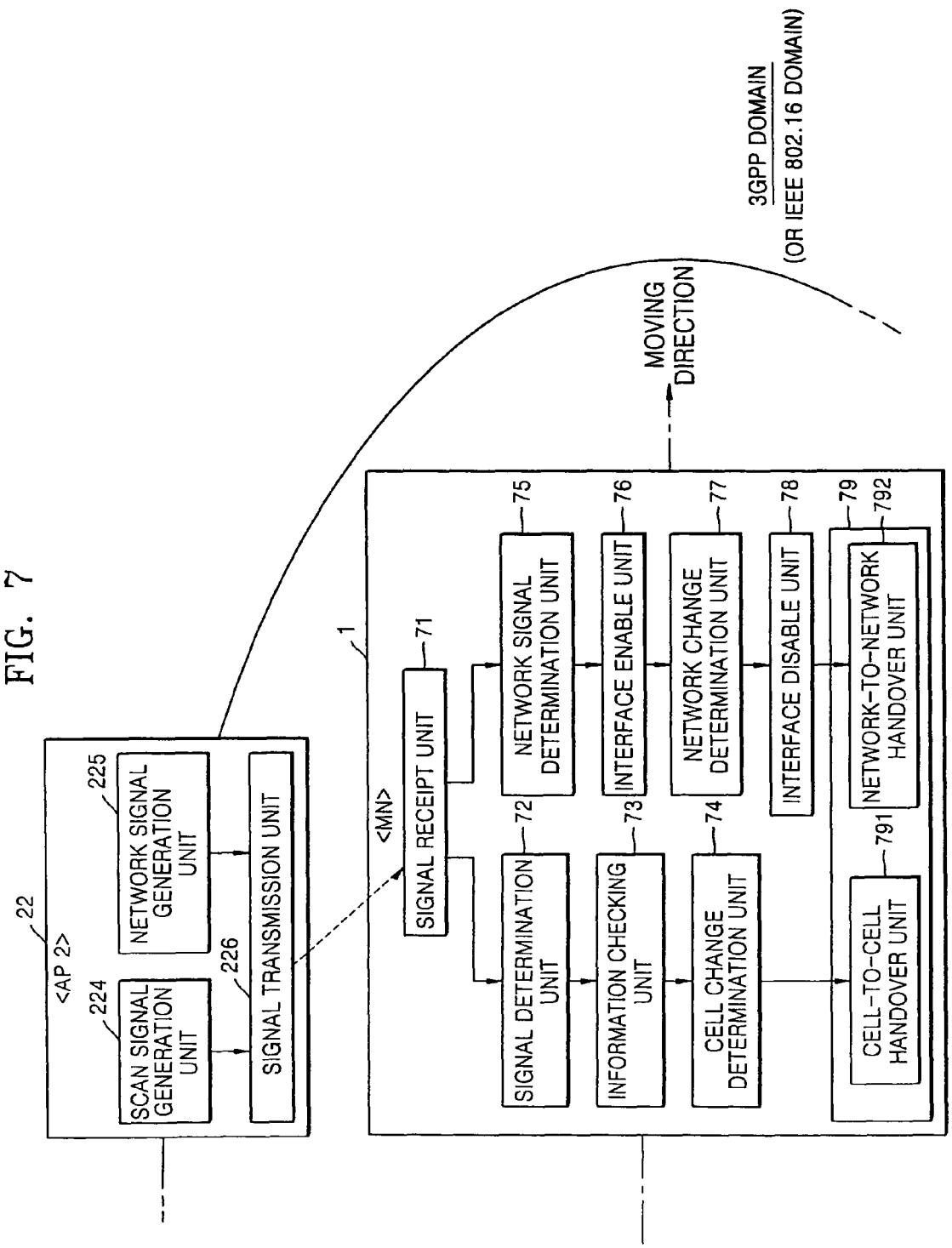
FIG. 7 is a block diagram illustrating a second handover apparatus according to an embodiment of the present invention.

FIG. 7 is a block diagram illustrating a second handover apparatus according to an embodiment of the present invention. Referring to FIG. 7, the second handover apparatus installed in the second AP 22 includes a scan signal generation unit 224, a network signal generation unit 225, and a signal transmission unit 226. The second handover apparatus installed in the second AP 22 can predict whether the MN 1 moves to a new network by transmitting a network signal indicating that the second AP 22 moves from a first type network to a second type network.

The scan signal generation unit 224 generates a signal requiring the MN 1 to scan the second AP 22, i.e., a scan signal designating a cell managed by the second AP 22. According to the IEEE 802.11 standard, the scan signal includes a beacon frame and a probe response frame.

The network signal generation unit 225 generates a network signal indicating that the MN 1 moves from the first type network to the second type network. In the first communication environment shown in FIG. 1, the first type network is the IEEE 802.11 standard-based wireless LAN, and the second type network is the 3GPP standard-based cellular network. In the second communication environment shown in FIG. 2, the first type network is the IEEE 802.11 standard-based wireless LAN, and the second type network is the IEEE 802.16 standard-based wireless MAN.

Figure 8:
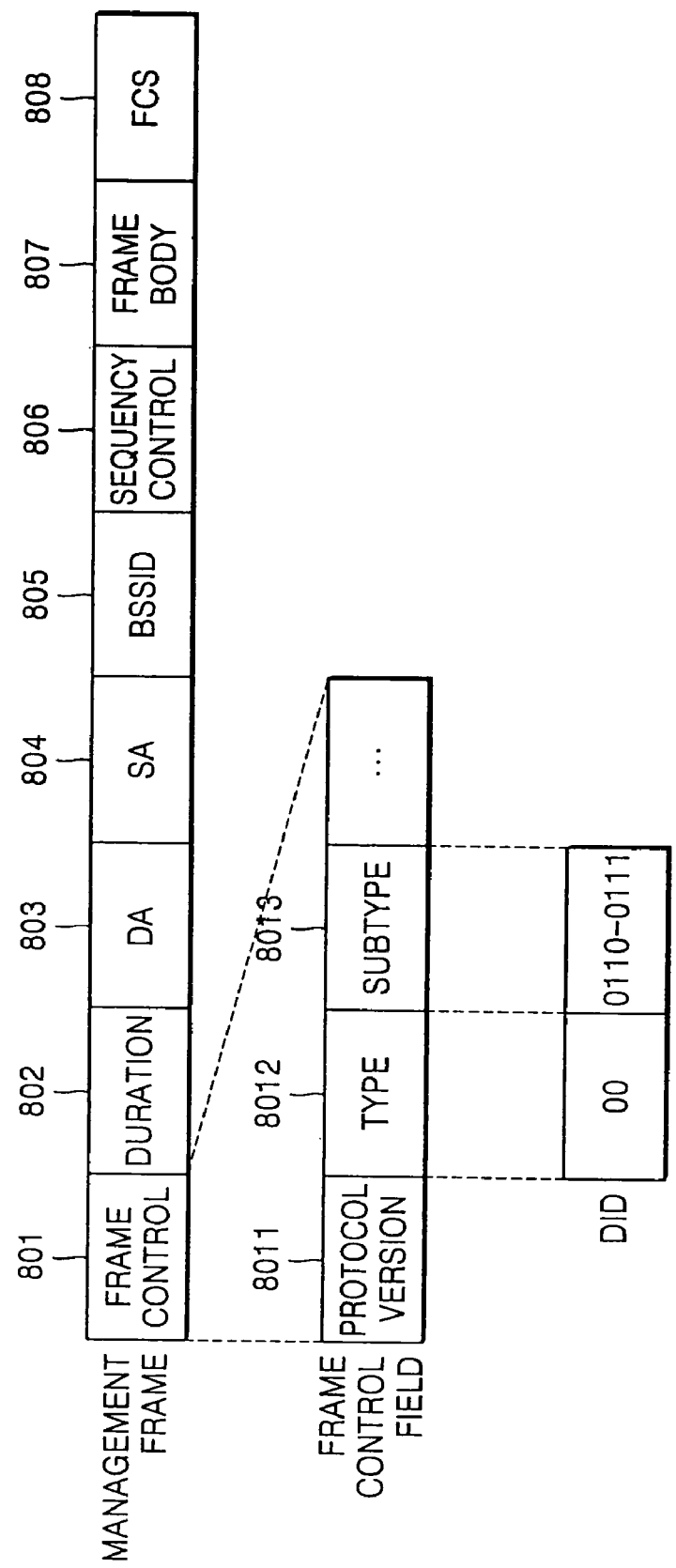
FIG. 8 is a diagram illustrating the format of a DID frame according to an embodiment of the present invention.

FIG. 8 is a diagram illustrating the format of a DID frame according to an embodiment of the present invention. Referring to FIG. 8, a management frame, which is created based on the IEEE 802.11 standard, includes a frame control field 801, a duration field 802, a destination address field 803, a source address field 804, a BSS ID field 805, a sequence control field 806, a frame body field 807, and a frame check sequence field 808.

The frame control field 801 includes a protocol version field 8011, a type field 8012, a subtype field 8013, and other fields.

A subtype field of a frame control field of a management frame may be used to define a new signal or a new frame indicating that an AP is located at the border of its subnet. A subtype field value is set to any one of 0110~0111 that indicates the new signal as a network signal. 01101~0111 may be any value that has not yet been designated by the IEEE 802.11 standard. If a type field of the border frame has a value of 0, the new frame is one type of management frame. A management frame set to any one of 0110~0111 that indicates the new signal as a network signal is referred to as a DID frame in the present embodiment.

Referring to FIG. 7, the signal transmission unit 226 transmits a scan signal generated by the scan signal generation unit 224 and a network signal generated by the network signal generation unit 225 to the MN 1. The signal transmission unit 226 notifies the MN 1 that the MN 1 is constantly on the move within the cell managed by the MN 1 by transmitting the scan signal and that the MN 1 moves to a new network by transmitting the network signal.

The second handover apparatus located in the MN 1 includes a signal receipt unit 71, a signal determination unit 72, a cell information checking unit 73, a cell change determination unit 74, a network signal determination unit 75, an interface enable unit 76, a network change determination unit 77, an interface disable unit 78, and a handover unit 79. The handover unit 79 includes a cell-to-cell handover unit 791 and a network-to-network handover unit 792.

The signal receipt unit 71 receives a signal from the second AP 22 that connects the MN 1 to a first type network. The MN 1 must be located in the cell managed by the second AP 22.

The scan signal determination unit 72 determines whether the signal received by the signal receipt unit 71 is a scan signal designating the cell managed by the second AP 22. The scan signal determination unit 72 may determine whether the received signal from the second AP 22 is a beacon signal or a probe response signal designating the second BSS. If the type field of the received signal has a value of 0, and the subtype field of the received signal has a value of 1000, then the scan signal determination unit 72 determines the received signal as a beacon signal. If the type field of the received signal has a value of 0, and the subtype field of the received signal has a value of 0101, then the scan signal determination unit 72 determines the received signal as a probe response signal.

If the scan signal determination unit 72 determines the received signal as the scan signal, the cell information checking unit 73 checks cell information included in the received signal. As described above, the beacon frame and the probe response frame, which are one type of the management frame, includes the BSS ID field 405. According to the IEEE 802.11 standard, ID of a BSS corresponding to a cell managed by an AP is contained in the BSS ID field 405. The cell information checking unit 73 checks cell information based on the BSS ID field 405 of the beacon frame or the probe response frame.

The cell change determination unit 74 determines whether the MN 1 has moved from one cell to another cell based on the cell information checked by the cell information checking unit 73. If the ID of the BSS is not identical to an ID of a previous BSS, the cell change determination unit 74 determines that the MN 1 has moved from one cell to another cell.

The cell-to-cell handover unit 791 selectively performs a handover based on the determination results output from the scan signal determination unit 72. To be more specific, if the cell change determination unit 74 determines that the MN 1 has moved from one cell to another cell, the cell-to-cell handover unit 791 performs a handover. If a change in cells corresponds to a change in BSSs, the cell-to-cell handover unit 791 performs a link layer handover. If the change in cells corresponds to a change in subnets, the cell-to-cell handover unit 791 performs a link layer handover and an IP layer handover.

The network signal determination unit 75 determines whether the signal received by the signal receipt unit 71 has network information indicating that the MN 1 moves from the first type network to the second type network by referring to values stored in the type field 8012 and the subtype field 8013 of the frame control field 801 of the management frame.

If the network signal determination unit 75 determines that the received signal by the signal receipt unit 71 has the network information, the interface enable unit 76 enables an interface supporting the second type network. If the network signal determination unit 75 determines that the received signal has a 3GPP standard-based cellular network DID frame, the interface enable unit 76 enables an interface supporting a 3GPP standard-based cellular network. If the network signal determination unit 75 determines that the received signal has an IEEE 802.16 standard-based wireless MAN DID frame, the interface enable unit 76 enables an interface supporting an IEEE 802.16 standard-based wireless MAN.

The network change determination unit 77 determines whether the MN 1 has moved from one network to another network. The network change determination unit 77 determines whether using the interface enabled by the interface enable unit 76 by analyzing an environment of the interface supporting the first type network. To be more specific, if the signal received using the interface supporting the first type network has a low intensity, the network change determination unit 77 determines not using the interface supporting the first type network, and determines using an interface supporting the second type network.

If the network change determination unit 77 determines using the interface supporting the second type network, the interface disable unit 78 disables the interface supporting the first type network. According to the present embodiment, since the MN 1 can perform a handover in a state where an interface presently being used is enabled, the conventional problem that every interface needs to be enabled to perform a handover is overcome. As a result, a mobile node reduces power consumption. In particular, since a mobile node uses a portable battery, a reduction in power consumption is essential.

The network-to-network handover unit 792 selectively performs a handover based on the determination results output from the network signal determination unit 75. To be more specific, if the network change determination unit 77 determines using the interface supporting the second type network, the network-to-network handover unit 792 discontinues using the interface disabled by the interface disable unit 78 and starts using the interface enabled by the interface enable unit 76. If the network change determination unit 77 determines using an interface supporting the 3GPP standard-based cellular network, the network-to-network handover unit 792 performs a handover that changes from the IEEE 802.11 standard-based wireless LAN to the 3GPP standard-based cellular network. If the network change determination unit 77 determines using an interface supporting the IEEE 802.16 standard-based wireless MAN, the network-to-network handover unit 792 performs a handover that changes from the IEEE 802.11 standard-based wireless LAN to the IEEE 802.16 standard-based wireless MAN.

Figure 9:
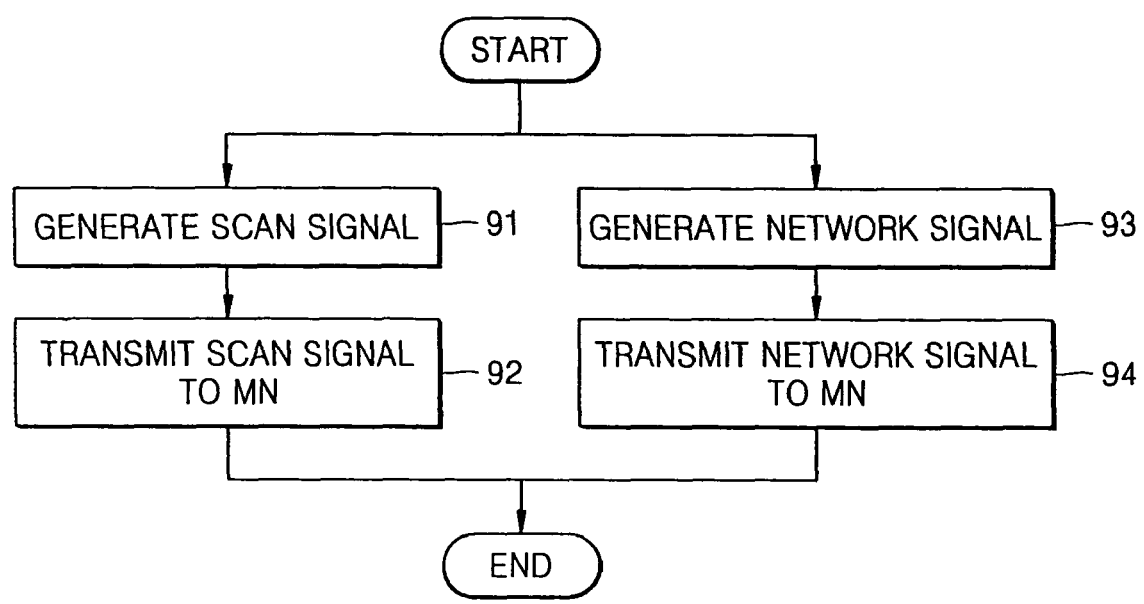
FIG. 9 is a flowchart illustrating a second handover method performed in an AP according to an embodiment of the present invention.

FIG. 9 is a flowchart illustrating a second handover method performed in the second AP 22 according to an embodiment of the present invention. Referring to FIG. 9, the first handover method performed in the second AP 22 is a time series process using the second handover apparatus installed in the second AP 22.

In operation 91, the second AP 22 generates a scan signal designating a cell managed by it.

In operation 92, the second AP 22 transmits the scan signal generated in operation 91 to the MN 1.

In operation 93, the second AP 22 generates a network signal indicating that the MN 1 moves from a first type network to a second type network.

In operation 94, the second AP 22 transmits the network signal generated in operation 93 to the MN 1.

Figure 10:
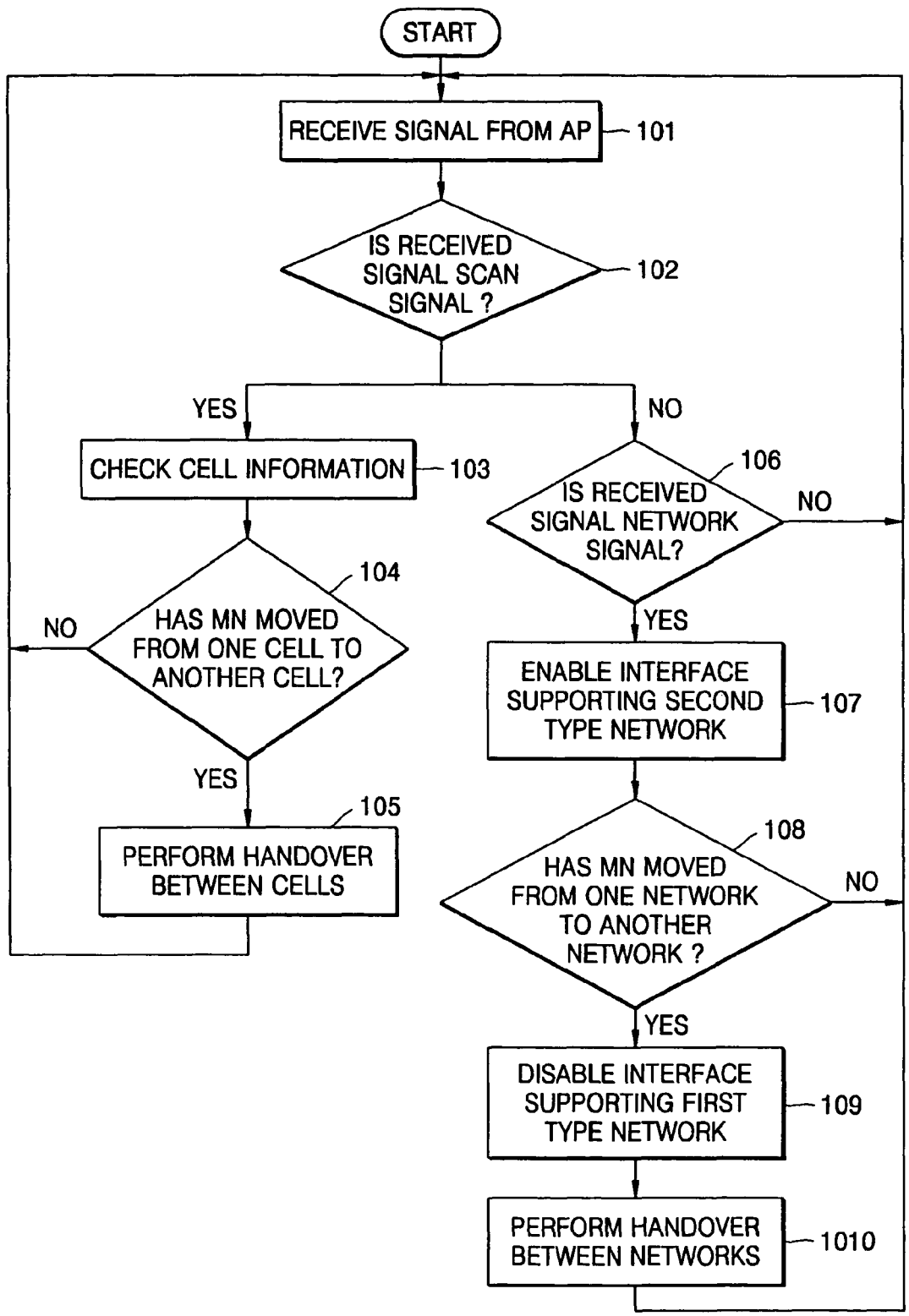
FIG. 10 is a flowchart illustrating a second handover method performed in an MN according to an embodiment of the present invention.

FIG. 10 is a flowchart illustrating a second handover method performed in the MN 1 according to an embodiment of the present invention. Referring to FIG. 10, the second handover method performed in the MN 1 is a time series process using the second handover apparatus installed in the MN 1.

In operation 101, the MN 1 receives a signal from the second AP 22 that connects the MN 1 to the first type network.

In operation 102, the MN 1 determines whether the received signal is a scan signal designating a cell managed by the AP 22. To be more specific, the MN 1 determines whether the received signal is a beacon signal or a probe response signal designating the second BSS.

In operation 103, if the received signal is determined to be the scan signal designating the cell managed by the AP 22, the MN 1 checks cell information included in the received signal.

In operation 104, the MN 1 determines whether it has moved from one cell to another cell based on the cell information checked in operation 103.

In operation 105, the MN 1 selectively performs a handover based on the determination results obtained in operation 104. To be more specific, if the MN 1 is determined to have moved from one cell to another cell in operation 104, it performs a cell-to-cell handover.

In operation 106, the MN 1 determines whether the received signal is a network signal indicating that the MN 1 moves from a first type network to a second type network by referring to values stored in the type field 8012 and the subtype field 8013 of the frame control field 801 of the management frame.

In operation 107, the MN 1 enables an interface supporting the second type network if the received signal is determined to be the network signal. To be more specific, if the received signal is determined to be a 3GPP standard-based cellular network DID signal, the MN 1 enables an interface supporting a 3GPP standard-based cellular network. If the received signal is determined to be an IEEE 802.16 standard-based wireless MAN DID signal, the MN 1 enables an interface supporting an IEEE 802.16 standard-based wireless MAN.

In operation 108, the MN 1 determines whether it has moved from one network to another network. To be more specific, the MN 1 determines using the interface enabled by the interface enable unit 76 by analyzing an environment of the interface supporting the first type network. If the signal received using the interface supporting the first type network has a low intensity, the MN 1 determines not using the interface supporting the first type network, and determines using an interface supporting the second type network.

In operation 109, if the MN 1 determines using the interface supporting the second type network, it disables the interface supporting the first type network.

In operation 1010, the MN 1 selectively performs a handover based on the determination results obtained in operation 106. To be more specific, if the MN 1 determines using the interface supporting the second type network, the MN 1 discontinues using the interface disabled in operation 108 and starts using the interface enabled in operation 107. If the MN 1 determines using an interface supporting the 3GPP standard-based cellular network, the MN 1 performs a handover that changes from the IEEE 802.11 standard-based wireless LAN to the 3GPP standard-based cellular network. If the MN 1 determines using an interface supporting the IEEE 802.16 standard-based wireless MAN, the MN 1 performs a handover that changes from the IEEE 802.11 standard-based wireless LAN to the IEEE 802.16 standard-based wireless MAN.

According to embodiments of the present invention, the MN 1 moves from the IEEE 802.11 standard-based wireless LAN to the 3GPP standard-based cellular network or the IEEE 802.16 standard-based wireless MAN. Meanwhile, the MN 1 can move from the 3GPP standard-based cellular network or the IEEE 802.16 standard-based wireless MAN to the IEEE 802.11 standard-based wireless LAN. In this case, a frame format according to the 3GPP standard or the IEEE 802.16 standard is used to notify the MN 1 that the MN 1 moves to a new network.

It is possible for the embodiments of the present invention to be realized on a computer-readable recording medium as a computer-readable code. Computer-readable recording mediums include every type of recording device that stores computer system-readable data. ROMs, RAMs, CD-ROMs, magnetic tapes, floppy discs, optical data storage, etc. are used as a computer-readable recording medium. Computer-readable recording mediums can also be realized in the form of a carrier wave (e.g., transmission through Internet).

According to the embodiments of the present invention, an MN can predict its movement to a new network, thereby performing a fast handover. Since an MN can perform a handover in a state where only the interface being presently used is enabled, the MN reduces power consumption. In particular, since the MN uses a portable battery, a reduction in power consumption is essential.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A handover method, which is performed in a mobile node (MN) that moves between different types of networks and has a plurality of interfaces supporting the different types of networks, the handover method comprising:
obtaining from a node that connects the MN to a first type network, network information indicating that the MN moves from the first type network to a second type network, wherein the network information includes an identifier of the second type network;
determining by only the MN whether to change networks based on an intensity of a signal received using an interface supporting the first type network according to whether the network information is obtained; and
selectively performing a handover between the first and second type networks based on the determination results,
wherein the network information including the identifier of the second type network, is transmitted from the node to the MN, one of periodically and according to request of the MN and an interface supporting the second type network is enabled based on the identifier of the second type network included in the network information.

2. The handover method of claim 1, further comprising:
enabling an interface supporting the second type network if the network information is obtained,
wherein the handover is performed using the enabled interface.

3. The handover method of claim 1, wherein the determining of whether to change network comprising:
determining whether to use an interface supporting the second type network by analyzing an environment of the interface supporting the first type network,
wherein the handover is performed if the interface supporting the second type network is determined to be used.

4. The handover method of claim 1, further comprising:
determining whether the signal received from the node is a signal designating a cell managed by the node,
wherein the handover between cells is selectively performed according to a change in cell based on the determination of whether the signal received from the node is the signal designating the cell managed by the node.

5. The handover method of claim 1, wherein the first type network is an IEEE 802.11 standard-based wireless LAN, and the second type network is a 3 generation partnership project (GPP) standard-based cellular network or an IEEE 802.16 standard-based wireless metropolitan area network (MAN).

6. The handover method of claim 1, wherein the network information is recorded in a reserved field of a capability information field of a frame body field of an IEEE 802.11 standard-based beacon frame or an IEEE 802.11 standard-based probe response frame.

7. The method of claim 6, wherein the beacon frame is periodically transmitted by the node and the probe response frame responds to a probe request frame received from the mobile node.

8. A handover apparatus, which is installed in a mobile node (MN) that moves between different types of networks and has a plurality of interfaces supporting the different types of networks, the handover apparatus comprising:
a network information check unit checking whether a signal received from a node that connects the MN to a first type network contains network information indicating that the MN moves from the first type network to a second type network, wherein the network information includes an identifier of the second type network;
a network change determination unit determining by only the MN whether to change networks based on an intensity of a signal received using an interface supporting the first type network according to whether the network information is obtained; and
a handover unit selectively performing a handover between the first and second type networks based on the determination results by the network change determination unit,
wherein the network information including the identifier of the second type network, is transmitted from the node to the MN, one of periodically and according to request of the MN and an interface supporting the second type network is enabled based on the identifier of the second type network included in the network information.

9. The handover apparatus of claim 8, further comprising:
an interface enable unit enabling an interface supporting the second type network if the signal is determined to contain the network information,
wherein the handover unit performs the handover using the interface enabled by the interface enable unit.

10. The handover apparatus of claim 8, wherein
the network change determination unit determines whether to use an interface supporting the second type network by analyzing an environment of the interface supporting the first type network,
and the handover unit performs the handover if the network change determination unit determines to use the interface supporting the second type network.

11. The handover apparatus of claim 8, wherein the beacon frame is periodically transmitted by the node and the probe response frame responds to a probe request frame received from the mobile node.

12. A handover method, which is performed in a mobile node (MN) that moves between different types of networks and has a plurality of interfaces supporting the different types of networks, the handover method comprising:
determining whether a signal received from a node that connects the MN to a first type network is a network signal indicating that the MN moves from the first type network to a second type network, wherein the network signal includes an identifier of the second type network;
determining by only the MN whether to change networks based on an intensity of a signal received using an interface supporting the first type network; and
selectively performing a handover between the first and second type networks based on the determination results,
wherein the network signal including the identifier of the second type network, is transmitted from the node to the MN, one of periodically and according to request of the MN and an interface supporting the second type network is enabled based on the identifier of the second type network included in the network information.

13. The handover method of claim 12, further comprising:
enabling an interface supporting the second type network if the signal is determined to be the network signal indicating that the MN moves from the first type network to the second type network,
wherein the handover is performed using the enabled interface.

14. The handover method of claim 12, further comprising:
determining whether to use an interface supporting the second type network by analyzing an environment of the interface supporting the first type network,
wherein the handover is performed if the interface supporting the second type network is determined to be used.

15. The handover method of claim 12, further comprising:
determining whether the signal received from the node is a scan signal designating a cell to be managed by the node,
wherein the handover between cells is selectively performed based on the determination of whether the signal received from the node is the scan signal designating the cell to be managed by the node.

16. The handover method of claim 12, wherein the first type network is an IEEE 802.11 standard-based wireless LAN, and the second type network is a 3GPP standard-based cellular network or an IEEE 802.16 standard-based wireless MAN.

17. The handover method of claim 12, wherein the network signal is determined by referring to a value recorded in a subtype field of a frame control field of an IEEE 802.11 standard-based management frame.

18. The handover method of claim 12, wherein the beacon frame is periodically transmitted by the node and the probe response frame responds to a probe request frame received from the mobile node.

19. A handover apparatus, which is installed in a mobile node (MN) that moves between different types of networks and has a plurality of interfaces supporting the different types of networks, the handover apparatus comprising:
- a network signal determination unit determining whether a signal received from a node that connects the MN to a first type network is a network signal indicating that the MN moves from the first type network to a second type network, wherein the network signal includes an identifier of the second type network;
- network change determination unit determining by only the MN whether to change networks based on an intensity of a signal received using an interface supporting the first type network; and
- a handover unit selectively performing a handover between the first and second type networks based on the determination results obtained by the network signal determination unit,
- wherein the network signal including the identifier of the second type network, is transmitted from the node to the MN, one of periodically and according to request of the MN and an interface supporting the second type network is enabled based on the identifier of the second type network included in the network information.

20. The handover apparatus of claim 19, further comprising:
- an interface enable unit enabling an interface supporting the second type network if the network signal determination unit determines the received signal is the network signal,
- wherein the handover unit performs the handover using the interface enabled by the interface enable unit.

21. The handover apparatus of claim 19, wherein
- the network change determination unit further determines whether to use an interface supporting the second type network by analyzing an environment of the interface supporting the first type network,
- and the handover unit performs the handover if the network change determination unit determines to use the interface supporting the second type network.

22. The handover apparatus of claim 19, wherein the beacon frame is periodically transmitted by the node and the probe response frame responds to a probe request frame received from the mobile node.

23. A computer-readable recording medium, on which a computer program for executing a handover method, which is performed in a mobile node (MN) that moves between different types of networks and has a plurality of interfaces supporting the different types of networks, is recorded, the handover method comprising:
- determining whether a signal received from a node that connects the MN to a first type network contains network information indicating that the MN moves from the first type network to a second type network, wherein the network information includes an identifier of the second type network;
- determining by only the MN whether to change networks based on an intensity of a signal received using an interface supporting the first type network according to whether the network information is obtained; and
- selectively performing a handover between the first and second type networks based on the determination results,
- wherein the network information including the identifier of the second type network, is transmitted from the node to the MN, one of periodically and according to request of the MN and an interface supporting the second type network is enabled based on the identifier of the second type network included in the network information.

24. The computer-readable recording medium of claim 23, wherein the beacon frame is periodically transmitted by the node and the probe response frame responds to a probe request frame received from the mobile node.

25. A computer-readable recording medium, on which a computer program for executing a handover method, which is performed in a mobile node (MN) that moves between different types of networks and has a plurality of interfaces supporting the different types of networks, is recorded, the handover method comprising:
- determining whether a signal received from a node that connects the MN to a first type network is a network signal indicating that the MN moves from the first type network to a second type network, wherein the network signal includes an identifier of the second type network;
- determining by only the MN whether to change networks based on an intensity of a signal received using an interface supporting the first type network; and
- selectively performing a handover between the first and second networks based on the determination results,
- wherein the network signal including the identifier of the second type network, is transmitted from the node to the MN, one of periodically and according to request of the MN and an interface supporting the second type network is enabled based on the identifier of the second type network included in the network information.

26. The computer-readable recording medium of claim 25, wherein the beacon frame is periodically transmitted by the node and the probe response frame responds to a probe request frame received from the mobile node.

27. A handover method, which is performed in a mobile node (MN) that moves between different types of networks and has a plurality of interfaces supporting the different types of networks, the handover method comprising:
- determining whether a signal received from a node that connects the MN to a first type network includes network information indicating that the MN moves from the first type network to a second type network;
- enabling an interface supporting the second type network if determined that the signal includes the network information;
- determining by only the MN whether to change networks based on an intensity of a signal received using an interface supporting the first type network;
- disabling an interface supporting the first type network if determined that networks are changed; and
- selectively performing a handover according to a change in a type of a network in which the MN is located, by using the enabled interface,
- wherein the network information including the identifier of the second type network, is transmitted from the node to the MN, one of periodically and according to request of the MN and the interface supporting the second type network is enabled based on the identifier of the second type network included in the network information.

28. The handover method of claim 27, wherein the determining of whether to change networks further comprises:
- determining whether to use the interface supporting the second type network based on an environment of an interface supporting the first type network,
- wherein the handover is performed if the interface supporting the second type network is determined to be used.

29. The handover method of claim 27, further comprising:
determining whether the signal received from the node is a signal designating a cell managed by the node,
wherein the handover is selectively performed according to a change in a cell in which the MN is located based on the determination of whether the signal received from the node is the signal designating the cell managed by the node.

30. The handover method of claim 27, wherein the first type network is an IEEE 802.11 standard-based wireless LAN, and the second type network is a third generation partnership project (GPP) standard-based cellular network or an IEEE 802.16 standard-based wireless metropolitan area network (MAN).

31. The handover method of claim 27, wherein the network information is recorded in a reserved field of a capability information field of a frame body field of an IEEE 802.11 standard-based beacon frame or an IEEE 802.11 standard-based probe response frame.

32. A computer readable recording medium having recorded thereon a program for executing the method of claim 27.

33. A handover apparatus, which is installed in a mobile node (MN) that moves between different types of networks and has a plurality of interfaces supporting the different types of networks, the handover apparatus comprising:
a network information determining unit determining whether a signal received from a node that connects the MN to a first type network includes network information indicating that the MN moves from the first type network to a second type network;
an interface enabling unit enabling an interface supporting the second type network if determined that the signal includes the network information;
a network change determination unit determining by only the MN whether to change networks based on an intensity of a signal received using an interface supporting the first type network; and
an interface disabling unit disabling an interface supporting the first type network if determined that networks are changed; and
a handover performing unit selectively performing a handover according to a change in a type of a network in which the MN is located, by using the interface enabled by the interface enabling unit,
wherein the network information including the identifier of the second type network, is transmitted from the node to the MN, one of periodically and according to request of the MN and the interface supporting the second type network is enabled based on the identifier of the second type network included in the network information.

34. The handover apparatus of claim 33, wherein the network change determining unit further determines whether to use the interface supporting the second type network based on an environment of an interface supporting the first type network,
and the handover performing unit performs the handover if the network change determining unit determines to use the interface supporting the second type network.

35. A handover method, which is performed in a mobile node (MN) that moves between different types of networks and has a plurality of interfaces supporting the different types of networks, the handover method comprising:
determining whether a signal received from a node that connects the MN to a first type network is a network signal indicating that the MN moves from the first type network to a second type network;
enabling an interface supporting the second type network if determined that the signal is the network signal;
determining by only the MN whether to change networks based on an intensity of a signal received using an interface supporting the first type network; and
disabling an interface supporting the first type network if determined that networks are changed; and
selectively performing a handover according to a change in a type of a network in which the MN is located, by using the enabled interface,
wherein the network signal including the identifier of the second type network, is transmitted from the node to the MN, one of periodically and according to request of the MN and the interface supporting the second type network is enabled based on the identifier of the second type network included in the network information.

36. The handover method of claim 35, wherein the determining of whether to change networks comprises: determining whether to use the interface supporting the second type network based on an environment of an interface supporting the first type network,
wherein the handover is performed if the interface supporting the second type network is determined to be used.

37. The handover method of claim 35, further comprising:
determining whether the signal received from the node is a scan signal designating a cell managed by the node,
wherein the handover is selectively performed according to a change in a cell in which the MN is located based on the determination of whether the signal received from the node is the scan signal designating the cell managed by the node.

38. The handover method of claim 37, wherein the first type network is an IEEE 802.11 standard-based wireless LAN, and the second type network is a third generation partnership project (GPP) standard-based cellular network or an IEEE 802.16 standard-based wireless metropolitan area network (MAN).

39. The handover method of claim 37, wherein the scan signal is recorded in a sub-type field of a frame control field of an IEEE 802.11 standard-based management frame.

40. A computer readable recording medium having recorded thereon a program for executing the method of claim 35.

41. A handover apparatus, which is installed in a mobile node (MN) that moves between different types of networks and has a plurality of interfaces supporting the different types of networks, the handover apparatus comprising:
a network signal determining unit determining whether a signal received from a node that connects the MN to a first type network is a network signal indicating that the MN moves from the first type network to a second type network;
an interface enabling unit enabling an interface supporting the second type network if the network signal determining unit determines that the signal is the network signal;
a network change determination unit determining by only the mobile node whether to change networks based on an intensity of a signal received using an interface supporting the first type network;
an interface disabling unit disabling an interface supporting the first type network if determined that networks are changed; and
a handover performing unit selectively performing a handover according to a change in a type of a network in which the MN is located, by using the interface enabled by the interface enabling unit, wherein the network signal including the identifier of the second type network, is transmitted from the node to the MN, one of periodically and according to request of the MN and the interface supporting the second type network is enabled based on the identifier of the second type network included in the network information.

42. The handover apparatus of claim 41, wherein the network change determining unit further comprises determining whether to use the interface supporting the second type network based on an environment of an interface supporting the first type network,
and the handover performing unit performs the handover if the network change determining unit determines to use the interface supporting the second type network.

* * * * *

UNITED STATES PATENT AND TRADEMARK OFFICE
CERTIFICATE OF CORRECTION

PATENT NO. : 8,259,670 B2  
APPLICATION NO. : 11/143577  
DATED : September 4, 2012  
INVENTOR(S) : Soo-hong Park et al.

Page 1 of 1

It is certified that error appears in the above-identified patent and that said Letters Patent is hereby corrected as shown below:

Column 13, Line 32 (Approx.), In Claim 7, delete "The method" and insert
-- The handover method --, therefor.

Signed and Sealed this
Twentieth Day of November, 2012

David J. Kappos
*Director of the United States Patent and Trademark Office*